United States Patent [19]
Nakayama et al.
[11] Patent Number: 4,714,061
[45] Date of Patent: Dec. 22, 1987

[54] INLINE MULTIPLE CYLINDER ENGINE FOR MOTORCYCLES

[75] Inventors: Yoshiharu Nakayama, Hamamatsu; Youichi Ohnishi, Iwata, both of Japan
[73] Assignee: Yamaha Hatsudoki Kabushiki Kaisha, Japan

[21] Appl. No.: 759,946
[22] Filed: Jul. 29, 1985
[30] Foreign Application Priority Data
Jul. 31, 1984 [JP] Japan ............................ 59-160599
[51] Int. Cl.[4] ............................ B62D 61/02
[52] U.S. Cl. ............................ 123/195 R; 180/219
[58] Field of Search ............................ 123/195 R, 195 C; 180/219

[56] References Cited

U.S. PATENT DOCUMENTS 4,198,947 4/1980 Rassey ............................ 123/195
4,378,763 4/1983 Ishihama ............................ 123/195
4,513,838 4/1985 Tsuboi ............................ 180/219
4,550,794 11/1985 Inoue et al. ............................ 180/219

FOREIGN PATENT DOCUMENTS 57-162930 10/1982 Japan .

*Primary Examiner*—Craig R. Feinberg
*Attorney, Agent, or Firm*—Ernest A. Beutler

[57] ABSTRACT

A motorcycle having an improved engine construction wherein the combined crankcase transmission assembly of the power plant is formed from upper and lower members that have mating faces that lie in a plane that is disposed at a downwardly extending angle in a forward direction to the horizontal. A cylinder block having a plurality of transversely spaced cylinder bores is affixed to the forward end of the upper member of the main casing and has the cylinder bores inclined at a forwardly extending angle to the vertical.

7 Claims, 3 Drawing Figures

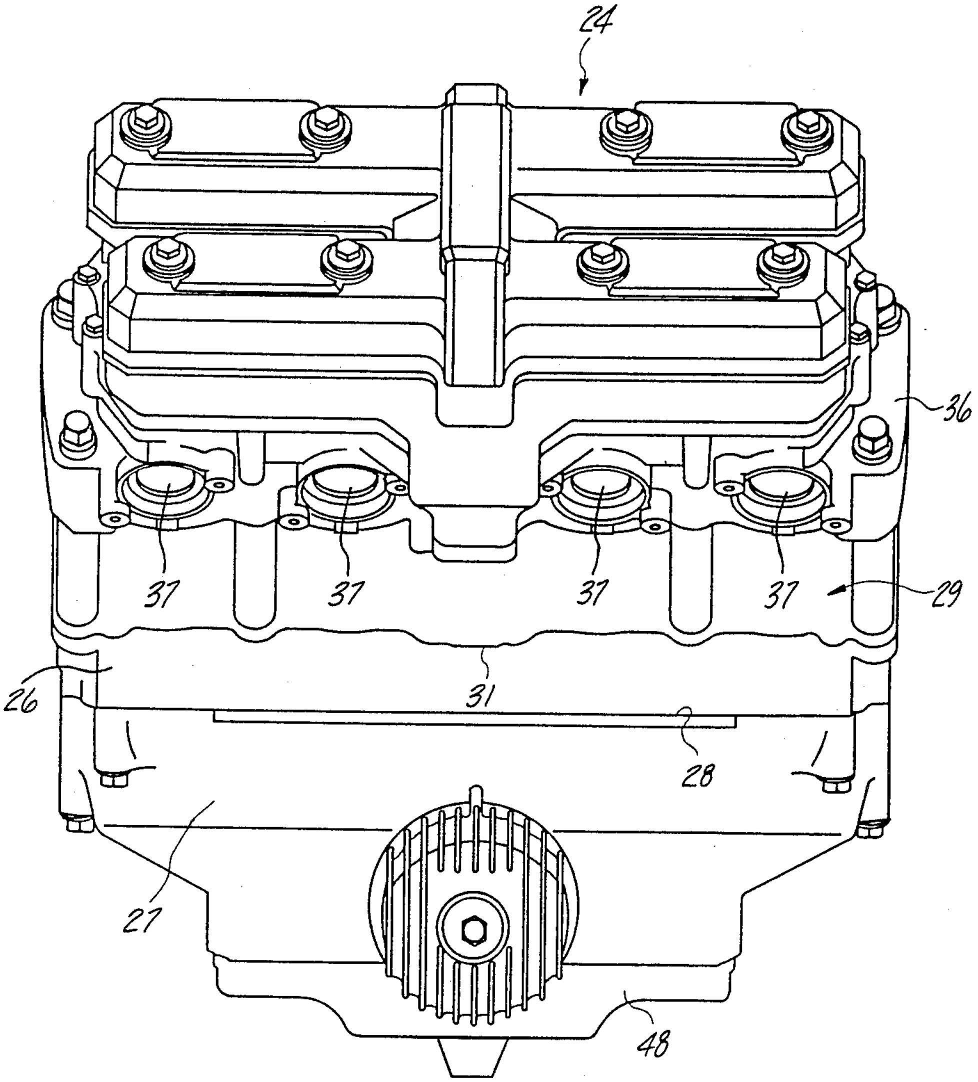
/Fig-3

INLINE MULTIPLE CYLINDER ENGINE FOR MOTORCYCLES

BACKGROUND OF THE INVENTION

This invention relates to an improved inline multiple cylinder engine for motorcycles and more particularly to an improved power plant construction for motorcycles.

One popular type of motorcycle power plant employs a reciprocating engine with a plurality of cylinders that are aligned and which are transversely disposed relative to the longitudinal axis of the motorcycle. It is also the practice with motorcycle power plants to embody a change speed transmission in the crankcase of the engine. In one form of such power plants, the crankcase transmission casing is formed from upper and lower castings that are split along a generally horizontally extending plane and the axis of the engine output shaft and the axes of the transmission shafts lie in this plane and extend transversely of the motorcycle. The cylinder block is then affixed to the uppermost casing. Although this arrangement has a number of advantages, the engine cylinders are generally positioned between the knees of a rider when the engine is disposed in a generally vertically extending position. Such power plant configurations require modification to conventional frames in order to accomodate the width of the engine and this coupled with the engines with itself causes the rider's knees to be positioned at an uncomfortably large angle.

In order to avoid these problems, it has been proposed to incline the cylinder block of the engine at a forward angle. However, with conventional constructions, this has given rise to further problems. If the cylinder block is forwardly inclined, the upper crankcase member tends to become very thin at its forward edge and thus the rigidity of the crankcase can become weakened and other problems result. This can be avoided by increasing the height of the engine but with the forward inclination, this also increases its length and gives rise to further problems is locating and supporting the engine and transmission within the motorcycle.

It is, therefore, a principal object of this invention to provide an improved compact and yet strong power plant for a motorcycle.

It is another object of this invention to provide an improved casing construction for a motorcycle having an inline engine and transversely disposed output and transmission shafts.

SUMMARY OF THE INVENTION

This invention is adapted to be embodied in a power plant of the type employed for powering a motor vehicle of the type having a longitudinal axis and comprise a main casting comprised of a lower member and an upper member having mating faces lying in a plane. An engine output shaft and a change speed transmission having at least one shaft driven by the engine output shaft are contained within the casing. The shafts are journaled for rotation about an axis that lies in the plane of the mating faces. A cylinder block is affixed to the upper member of the main casing in proximity to its forward edge. In accordance with the invention, the plane is inclined to the horizontal and extends downwardly in a forward direction.

BRIEF DESCRIPTION OF THE DRAWINGS

FIG. 3 is a front elevational view of the power plant.

DETAILED DESCRIPTION OF THE PREFERRED EMBODIMENT

Figure 1:
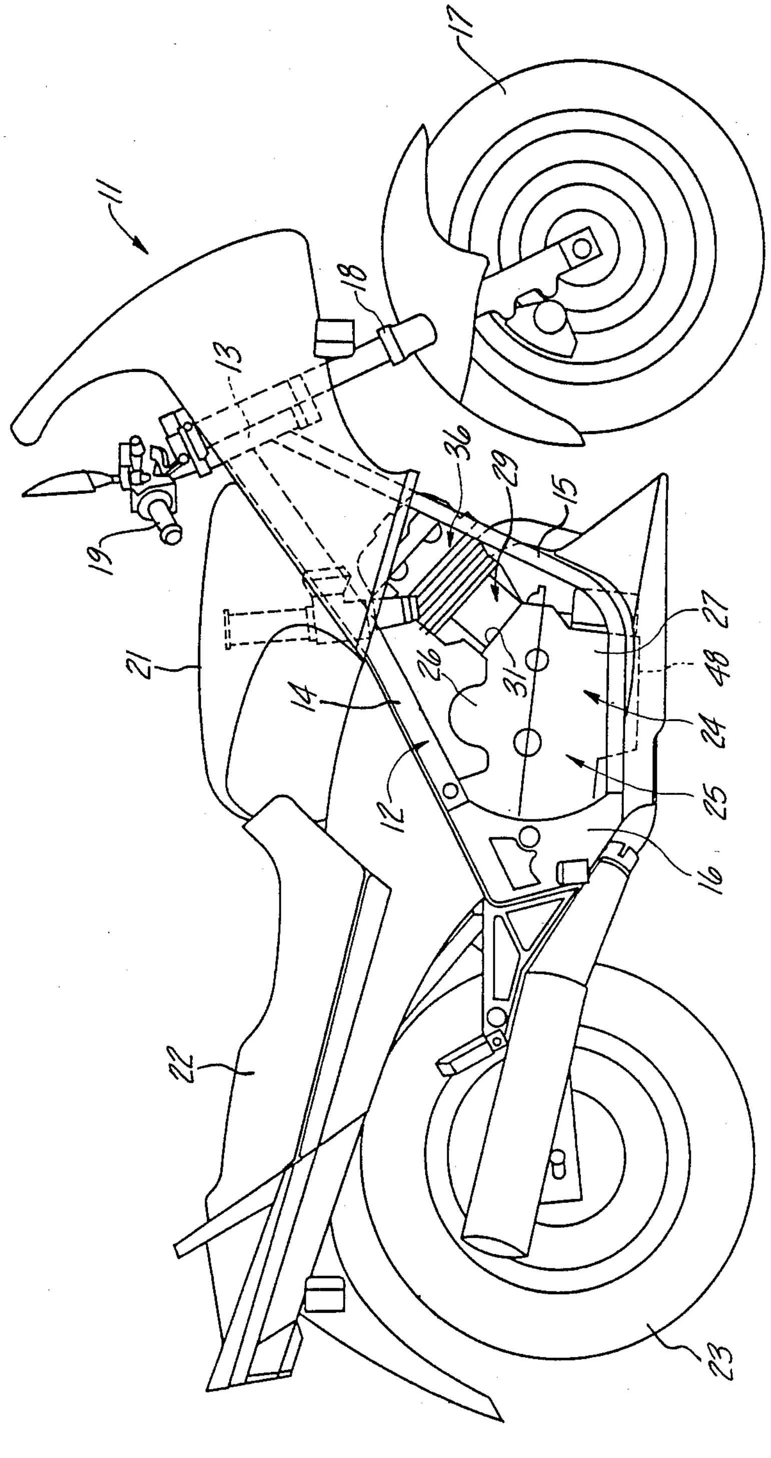
FIG. 1 is a side elevational view of a motorcycle having a power plant constructed in accordance with an embodiment of the invention.

Referring first to FIG. 1, a motorcycle constructed in accordance with an embodiment of the invention is identified generally by the reference numeral 11. The motorcycle 11 includes a frame assembly, indicated generally by the reference numeral 12, that includes a head tube 13 and a pair of spaced apart generally downwardly and longitudinally extending tank rails 14. A pair of down tubes 15 are also affixed to the head tube 12 and extend downwardly and rearwardly so as to provide a generally cradle shape. The tank rails 12 and rear ends of the down tubes 15 are affixed, respectively, to brackets 16 positioned at each side of the motorcycle so as to complete the main construction of the frame.

A front wheel 17 is supported by means of a front fork 18 and is steerable by means of a handlebar 19 in a known manner. A fuel tank 21 is carried by the tank rails 14 rearwardly of the handlebar 19 and head tube 13. A seat 22 is positioned rearwardly of the fuel tank 21 and disposed at least partially over a rear wheel 23.

A power plant constructed in accordance with a preferred embodiment of the invention is identified generally by the reference numeral 24 and is supported within the frame 12 for powering the rear wheel 23. This power plant will now be described by particular reference to FIGS. 2 and 3.

The power plant 24 is comprised of a main casing assembly, indicated generally by the reference numeral 25, which is, in turn, made up of an upper member 26 and a lower member 27 which are joined together along a mating surface 28. As will become apparent, the main casing 25 houses and rotatably journals the engine output shaft and the shafts of a change speed transmission. These shafts all are supported so that their axes of rotation lie in the plane defined by the mating faces 28.

A cylinder block assembly 29 is affixed to the forward edge of the main casing upper member 26 along a mating face 31. The cylinder block 29 is provided with a plurality of aligned and transversely disposed cylinder bores 32 (four in the illustrated embodiment). The cylinder bores 32 are aligned with each other and extend transversely to the longitudinal axis of the motorcycle 11.

Pistons 33 are supported within the cylinder bores 32 and are connected by means of connecting rods 34 to a crankshaft 35. The crankshaft 35 rotates about an axis which is defined in FIG. 2 by the intersection of a vertical plane V—V and a horizontal plane L—L. This axis also, as has been noted, lies on the plane defined by the mating faces 28 of the main casting upper and lower members 26 and 27.

A cylinder head, indicated generally by the reference numeral 36, is affixed to the cylinder block 29 in a known manner and is formed with forwardly extending exhaust ports 37 and generally vertically extending intake ports 38. Exhaust and intake valves 39 and 41, respectively, control the flow through the ports 37 and 38 and are operated by means of overhead mounted camshafts 42 and 43.

The crankshaft 35 drives the gear train of a change speed transmission comprised of a primary shaft 44 and a secondary shaft 45 on which a plurality of meshing gears 46 and 47 are supported. The gears 46 and 47 are selectively coupled for rotation with the shafts 44 and 45 to provide the desired output speed of the output shaft of the transmission for driving the rear wheel 23 at the desired speed ratio. In addition, a clutch mechanism (not shown) is contained within the chamber defined by the main casting 25.

Figure 2:
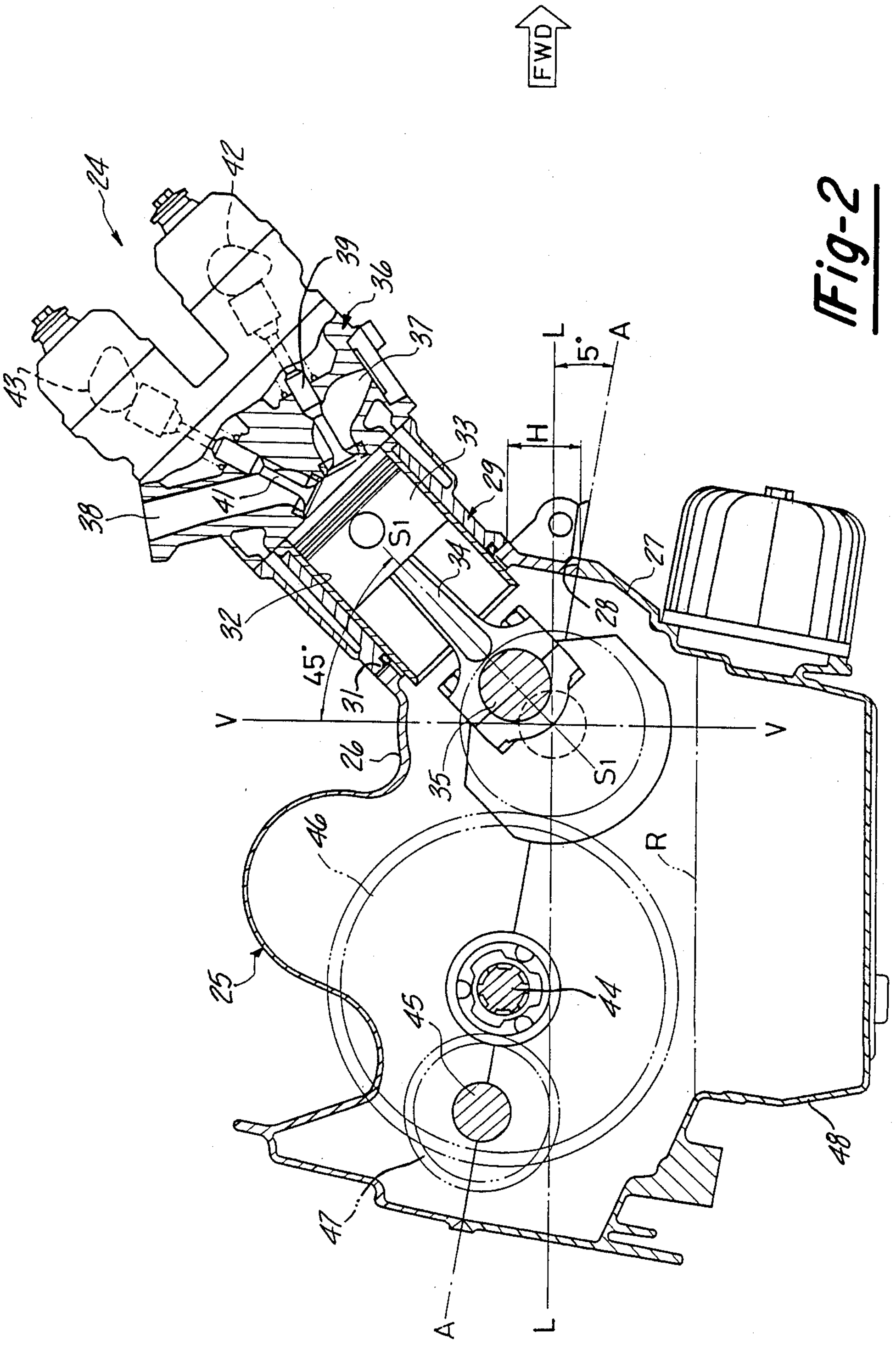
FIG. 2 is an enlarged, side elevational view, with portions broken away and other portions shown in section, of the power plant.

It should be noted that the axis of rotation of the shafts 44 and 45 also lie on the plane defined by the mating faces 28, this plane being identified by the line A—A in FIG. 2. This plane is offset at an angle to the horizontal line L—L so that the plane A—A extends downwardly in a forward direction at an angle of about 5°. Because of this downward inclination, the mating face 31 between the member 26 and the lower face of the cylinder block 29 can be rinsed so that its shortest height is the dimension H which is sufficient so as to provide adequate strength for the main casing 25. In addition, the axes of the cylinder bores 32 defined by the line S1—S1 is inclined at an angle of about 45° to the vertical plane V—V so that the cylinder block 29 and cylinder head 36 will be placed forwardly of the rider's knees and thus permit a convenient seating position for the rider.

The lower member 27 of the main casing 25 is provided with a sump area 48 that is generally depressed so as to provide a large oil capacity and yet which has a normal oil level R that is disposed beneath the crankshaft 35 and the gears 47 and 46 so that there will be no churning of the oil within the reservoir 48 that could cause it to be aerated.

It should be readily apparent that the described construction permits a very compact transverse engine arrangement with good support for all components and high strength without adversely affecting the rider's position. Although the invention has been described in conjunction with a four cylinder engine, it should be readily apparent that it can be utilized with engines having other cylinder numbers and also may be utilized in conjunction with either two or four cycle engines.

Although an embodiment of the invention has been illustrated and described, various changes and modifications may be made without departing from the spirit and scope of the invention, as defined by the appended claims.

We claim:

1. In a power plant of the type employed for powering a motor vehicle having a longitudinal axis comprising a main casing comprised of a lower member and an upper member having mating faces lying in a plane, an engine output shaft rotatable about a first forwardly disposed axis, and a change speed transmission having a primary shaft driven by said engine output shaft, and rotatable about a second axis parallel to said first axis, a secondary shaft rotatable about a third axis parallel to said first and said second axes and disposed rearwardly of said first and said second axes and gearing means driving said secondary shaft from said primary shaft, said first, second and third axes all lying in said plane, and a cylinder block affixed to said upper member of said main casing in proximity to the forward edge thereof, the improvement comprising said plan being inclined to the horizontal and extending downwardly in a forward direction so that said first axis lies below said second axis and said second axis lies below said third axis.

2. In a plant as set forth in claim 1 wherein the cylinder block is formed with a plurality of cylinder bores disposed transversely to the longitudinal axis.

3. In a power plant as set forth in claim 2 wherein the cylinder bores are inclined forwardly at an angle to the vertical.

4. In a power plant as set forth in claim 3 wherein the angle of inclination of the cylinder bores is greater than 30°.

5. In a power plant as set forth in claim 4 wherein the angle of inclination of the cylinder bores is about 45°.

6. In a power plant as set forth in claim 5 wherein the plane is inclined at an angle of about 5° to the horizontal.

7. In a power plant as set forth in claim 1 wherein the plane is inclined at an angle of about 5° to the horizontal.

* * * * *